United States Patent [19]

vandenEnden et al.

[11] Patent Number: 5,724,467

[45] Date of Patent: Mar. 3, 1998

[54] ADAPTER TO SECURE FIBER OPTIC CONNECTORS WITHIN A TELECOMMUNIATIONS BOX

[75] Inventors: John P. vandenEnden, Oshawa; Gregory H. Porter, Newmarket, both of Canada

[73] Assignee: The Whitaker Corporation, Wilmington, Del.

[21] Appl. No.: 705,503

[22] Filed: Aug. 29, 1996

Related U.S. Application Data

[60] Provisional application No. 60/005,214, Oct. 11, 1995.

[51] Int. Cl.$^6$ ............................................. G02B 6/38
[52] U.S. Cl. .......................... 385/134; 385/135; 385/59; 385/60
[58] Field of Search ............................. 385/134, 135, 385/56, 59, 60, 76

[56] References Cited

U.S. PATENT DOCUMENTS

| | | | |
|---|---|---|---|
| Re. 34,955 | 5/1995 | Anton et al. | 385/135 |
| 4,373,776 | 2/1983 | Purdy | 350/96.2 |
| 4,489,830 | 12/1984 | Charlebois et al. | 206/316 |
| 4,792,203 | 12/1988 | Nelson et al. | 350/96.2 |
| 4,793,681 | 12/1988 | Barlow et al. | 350/96.2 |
| 4,824,196 | 4/1989 | Bylander | 350/96.2 |
| 4,995,728 | 2/1991 | Finzel | 350/96.21 |
| 5,071,211 | 12/1991 | Debortoli et al. | 385/76 |
| 5,100,221 | 3/1992 | Carney et al. | 385/135 |
| 5,121,456 | 6/1992 | Essert et al. | 385/70 |
| 5,127,082 | 6/1992 | Below et al. | 385/135 |
| 5,138,688 | 8/1992 | Debortoli | 385/135 |
| 5,274,729 | 12/1993 | King et al. | 385/134 |
| 5,351,331 | 9/1994 | Chun et al. | 385/136 |
| 5,353,367 | 10/1994 | Czosnowski et al. | 385/135 |
| 5,363,465 | 11/1994 | Korkowski et al. | 385/135 |
| 5,363,466 | 11/1994 | Milanowski et al. | 385/135 |
| 5,367,594 | 11/1994 | Essert et al. | 385/70 |
| 5,402,515 | 3/1995 | Vidacovich et al. | 385/135 |
| 5,412,497 | 5/1995 | Kaetsu et al. | 385/134 |
| 5,420,958 | 5/1995 | Henson et al. | 385/135 |

*Primary Examiner*—John Ngo

[57] ABSTRACT

The invention comprises a fiber optic connector assembly which includes a panel having a plurality of fiber optic connectors mounted thereto. The panel has two ends with a securing hole. An adapter has two adapter members, each of the members having a body with an inner side, and outer side, and two ends. Two mounting members extend from the two ends along the outer side of the adapter member. A panel mounting portion is disposed along the inner side of the adapter member, the panel mounting portion includes an angled slot with opposing walls, the slot being dimensioned to receive the ends of the panel. Two recesses extend along each of the opposing walls, the recesses being aligned with each other and with the securing hole. The adapter members are received along both of the ends of the panel, the mounting members being received within adjacent parallel latching arms of a telecommunications box, such that the fiber optic connectors are angled within the box.

14 Claims, 2 Drawing Sheets

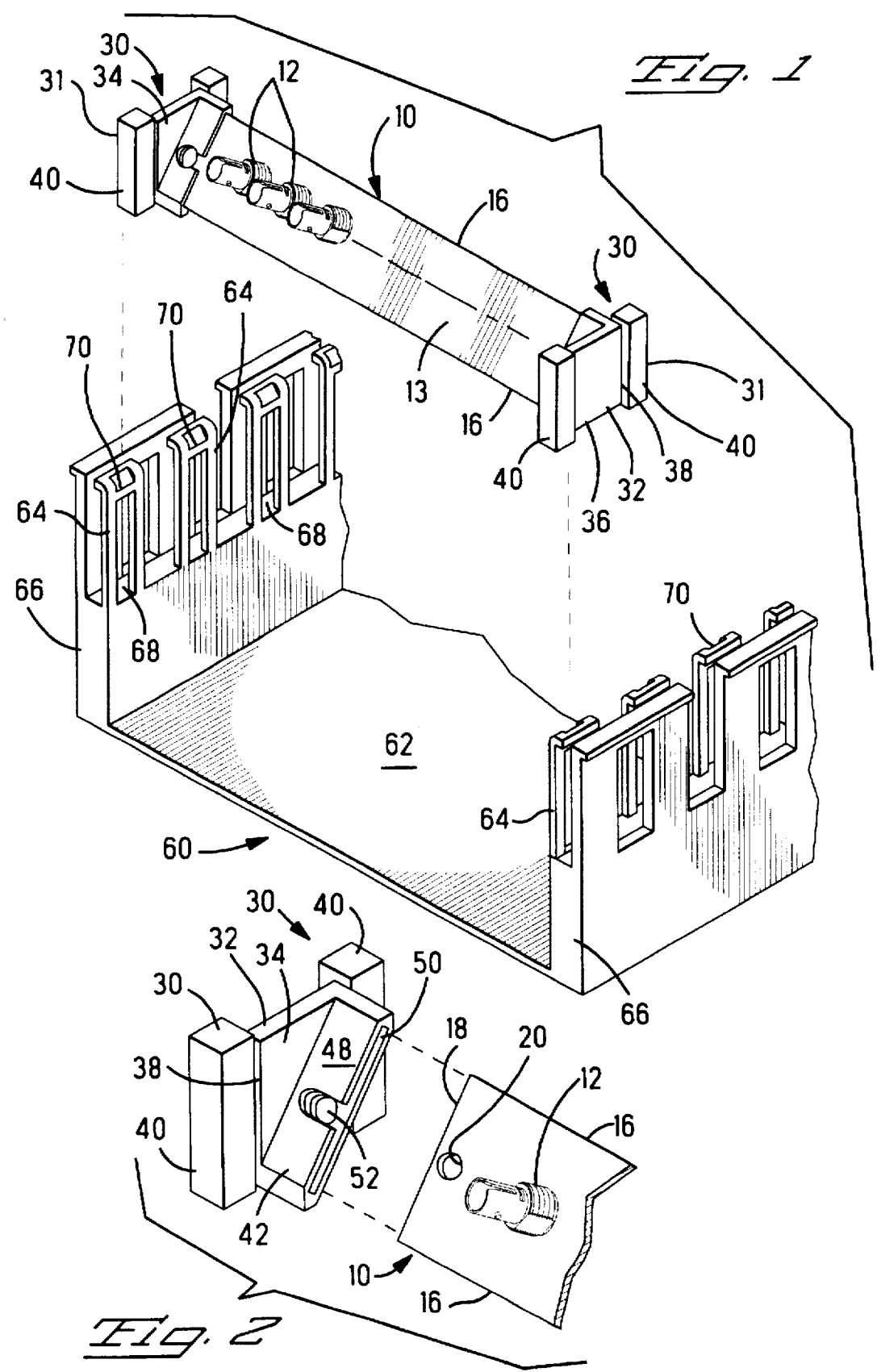

ADAPTER TO SECURE FIBER OPTIC CONNECTORS WITHIN A TELECOMMUNIATIONS BOX

CROSS REFERENCES TO RELATED APPLICATIONS

This application claims the benefit of U.S. Provisional application Ser. No. 60/005,214, filed Oct. 11, 1995.

FIELD OF THE INVENTION

This invention relates to an adapter for fiber optic connectors and more particularly to an adapter which can be used to secure the fiber optic connectors in an existing telecommunications mount.

BACKGROUND OF THE INVENTION

A building with multiple occupants will often have a telecommunications box. This box would contain a rack which holds electrical connectors to connect the incoming telecommunications lines with the different services and occupants in the building in order to provide voice and data communications. The electrical connector comprises typically twenty-five individual connections such that twenty-five lines can be interconnected. One such telecommunication rack is the BIX mount which includes a rack system and BIX connectors.

Other optical rack systems are known in which trays are used to hold optical fibers, the trays are then mounted into the rack system. U.S. Pat. No. 5,138,688 discloses a connector holder assembly for holding optical connectors. The assembly comprises a frame for holding a stack of connector holders. The connector holders are planar and include an area for mounting optical connectors and a storage area for the fibers. These holders are assembled into the optical fiber frames.

It would be an advantage to provide a holder for fiber optic connectors which can be secured into existing telecommunications racks, frames or mounts. It would also be an advantage to have an adapter which can be used on a panel of fiber optic connectors to secure the fiber optic connectors in the telecommunications rack.

SUMMARY OF THE INVENTION

The invention comprises a fiber optic connector assembly which includes a panel having a plurality of fiber optic connectors mounted thereto. The panel has two ends with a securing hole. An adapter has two adapter members, each of the members having a body with an inner side, and outer side, and two ends. Two mounting members extend from the two ends along the outer side of the adapter member. A panel mounting portion is disposed along the inner side of the adapter member, the panel mounting portion includes an angled slot with opposing walls, the slot being dimensioned to receive the ends of the panel. Two recesses extend along each of the opposing walls, the recesses being aligned with each other and with the securing hole. The adapter members are received along both of the ends of the panel, the mounting members being received within adjacent parallel latching arms of a telecommunications box, such that the fiber optic connectors are angled within the box.

BRIEF DESCRIPTION OF THE DRAWINGS

Embodiments of the present invention will now be described by way of example with reference to the accompanying drawings, in which:

FIG. 1 is an exploded isometric view showing a telecommunications rack, a fiber optic connector panel and the adapters of the present invention;

FIG. 2 is a view showing the panel exploded from the adapter;

DETAILED DESCRIPTION OF THE DRAWINGS

Figure 3:
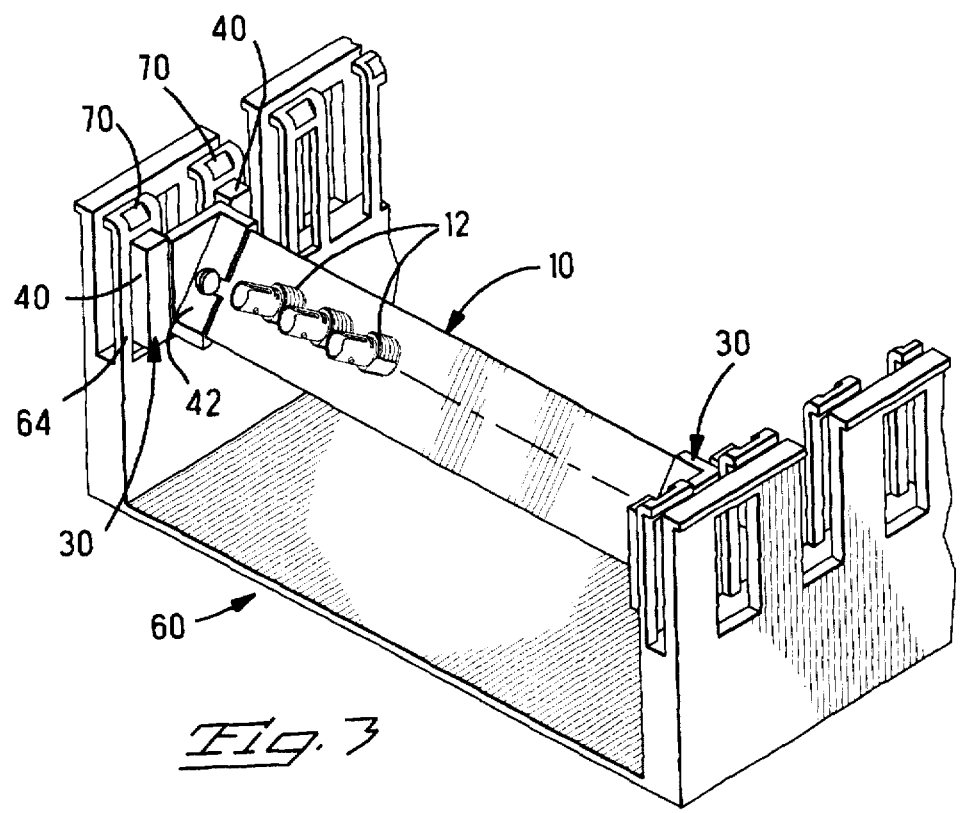
FIG. 3 is an isometric view showing the combination fully assembled.

FIG. 1 shows a representative panel 10 for holding fiber optic connectors. One example of this panel is shown in which the panel houses a series of fiber optic connectors 12, only three of which are shown. The fiber optic connectors could be ST-style, SC, or SC-Duplex optical connectors, for example. The fiber optic connectors could also be some other type of optical connector. It is to be understood that the panel has a series of connectors 12 which extend along the entire length of the panel 10. The panel can house various numbers and types of fiber optic connectors. For simplicity, the panel is shown with only a few connectors.

The panel 10 is a relatively flat, rectangular member which includes a front 13 and a rear side 14 through which the fiber optic connectors 12 extend. The front portion of the connector is shown in the front side 13 of the panel. Along the rear side 14 of the panel is the other half of the connector 12, see FIG. 14. These connectors provide a point of connection for a fiber optical cable having a matable connector on its end. The panel also includes top and bottom edges 16 and ends 18, see FIG. 2. Along either end are holes 20 which extend through the panel 10. The holes 20 are used to secure the panel 10 to some other apparatus. The panels 10, along with the connectors 12, are provided as an individual unit for use in any number of applications.

FIG. 1 shows a BIX mount 60 which is a standard telecommunications rack or frame. The mount 60 is a standard design which is used to hold BIX connectors (not shown). BIX connectors provide electrical connection between the incoming telecommunication service wires and the building telecommunication wires. The mount 60 is secured within a distribution box for the building. The electrical connector is then secured within the mount to provide connection to the building.

The mount 60 has a base 62 which is typically secured to a wall or the distribution box. Walls 66 extend upwardly from the base 62. Flexible latching arms 64 extend upwardly from the wall. The arms have a recess 68 centrally disposed in the latching arm 64 with a latch member 70 at the end of the latching arm 64 which is opposite to the base end. The flexible latching arms 64 are disposed along opposite sides of the mount 60 and are positioned such that a BIX connector can be received between two opposite latching arms 64 and secured thereto.

In order to secure the fiber optic connector panel 10 in the mount 60, an adapter 30 is used to hold the panel 10 and to secure it within the mount 60. By using the adapter 30, fiber optic cables can be organized within the existing distribution box of the building. The adapter 30 secures the panel 10 within the mount 60 such that the panel and the connectors are angled with respect to the base 62. This ensures that the fiber optic cables can be secured in the mount without excessive bending of the cable.

The adapter 30 is made of two individual members 31 which are essentially identical except for the fact that one member is a mirror image of the other member. Each member has a main body 32. The main body 32 has an inner side 34 and an outer side 36 and side edges 38. Along either edge 38 are mounting members 40. The mounting members are protrusions which extend from the edges 38 and beyond the outer side 36. The two mounting members 40 are spaced such that they can be secured to two adjacent latching arms 64 on the mount 60.

Along the inner side 34 is the panel mounting section 42. The section 42 includes walls 48 upstanding from the inner side 34 with a slot 50 centrally disposed in the member 40. Along either side of section 42 are two recesses 52 which are in alignment with each other. The slot is designed such that ends 18 of the panel 10 are received into the slot, see FIG. 2. The hole 30 is aligned with recesses 52 such that a screw or other mounting member can be passed through the recesses 52 and the hole 30 to secure the panel 10 to the adapter 30.

The panel mounting section 42 extends diagonally across the inner side of the adapter 30. The slot 50 is disposed at approximately a 60° angle with respect to the two parallel mounting members 40.

One adapter member 31 is received on one end 18 of the panel. The other, mirror image adapter member 31 is then received on the other end of the panel such that the mounting members 40 on either adapter member 31 are in alignment with each other. The panel 10 along with the adapter 30 form a subassembly which can then be mounted into the BIX mount 60. The assembly is mounted into the mount 60 by the mounting members 40 deflecting the latching arms 64 until the mounting members 40 are received in the recesses 68. The mounting members 40 are received into the recesses 68 of adjacent and opposite latching arms 64, see FIG. 3. The latching member 70 prevents the adapter from being removed from the BIX mount 60 without first deflecting the latching arm 64.

Figure 4:
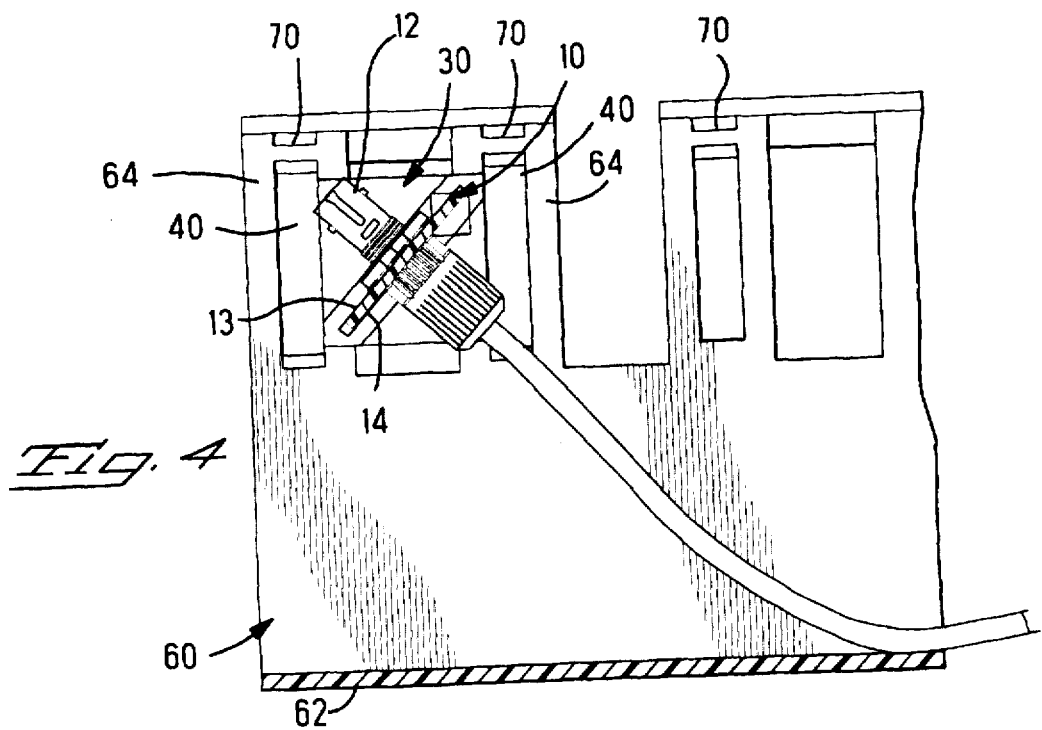
FIG. 4 is a cross sectional view showing the panel and the adapter mounted in the telecommunications mount.

The panel is secured in the mount at approximately a 60° angle so that the fiber optic cables can be accommodated in the mount without excessive bending of the fiber optic cables, see FIG. 4. The fiber optic connectors 12 can be connected and disconnected to allow the building service cables to be connected to fiber optic cables brought in from the outside. The cable extends from the rear portion of the connector, from the rear wall of the panel, at an angle to the base 62 of the mount 60. The fiber optic cable can then be secured along the base of the mount and any slack cable can be stored and secured within the base 62. The fiber optic cable extends from the rear of the panel at an angle to prevent unnecessary bending of the cable in the base 62 of the mount 60 and to allow the cable to be secured within the base.

It is thought that the adapter and the fiber optic connector assembly of the present invention and many of its intended advantages will be understood from the foregoing description. It is apparent that various changes may be made in the form, construction, and arrangement of parts thereof, without departing from the spirit or scope of the invention without sacrificing all of its material advantages.

We claim:

1. A fiber optic connector assembly, comprising:

a panel having a plurality of fiber optic connectors mounted thereto, the panel having two ends with a securing hole;

an adapter having two adapter members, each of the adapter members having a body with an inner side, an outer side, and two ends, two mounting members extend from the two ends along the outer side of the adapter member, the mounting members being protrusions which extend from the ends of the adapter member beyond the outer side, a panel mounting portion is disposed along the inner side of the adapter member, the panel mounting portion includes an angled slot with opposing walls, the slot being dimensioned to receive the ends of the panel, two recesses extend along each of the opposing walls, the recesses being aligned with each other and with the securing hole;

whereby the adapter members are received along both of the ends of the panel, the mounting members being received within adjacent parallel latching arms of a telecommunications box, such that the fiber optic connectors are angled within the box.

2. The connector assembly of claim 1, wherein the adapter members are mirror images of each other.

3. The connector assembly of claim 1, wherein the panel has a front side and a back side, the fiber optic connectors extending through the panels from the front to the back side.

4. The connector assembly of claim 3, wherein the fiber optic connectors are matable with a fiber on both the front side and the back side.

5. The connector assembly of claim 1, wherein the parallel latching arms have recesses to receive the mounting members therein, to latchably secure the adapter member thereto.

6. The connector assembly of claim 1, wherein the protrusions extend from the adapter member in a direction opposite to the opposing walls which surround the angled slot.

7. The connector assembly of claim 1, wherein the angled slot is approximately 60 degrees from the mounting members.

8. The connector assembly of claim 1, wherein the mounting members extend parallel to each other on either end of the adapter member.

9. The connector assembly of claim 1, wherein when the panel is received into the angled slot, the securing hole is in alignment with the two recesses along the opposing walls, to receive a securing member therein to secure the panel to the adapter member.

10. A fiber optic connector assembly, comprising:

a panel having a plurality of fiber optic connectors mounted thereto, the panel having two ends with a securing hole;

an adapter having two adapter members, each of the adapter members having a body with an inner side, an outer side, and two ends, two mounting members extend from the two ends along the outer side of the adapter member, a panel mounting portion is disposed along the inner side of the adapter member, the panel mounting portion includes an angled slot with opposing walls, the slot being dimensioned to receive the ends of the panel, two recesses extend along each of the opposing walls, the recesses being aligned with each other and with the securing hole, the adapter members being mirror images of each other;

whereby the adapter members are received along both of the ends of the panel, the mounting members being received within adjacent parallel latching arms of a telecommunications box, such that the fiber optic connectors are angled within the box.

11. A fiber optic connector assembly, comprising:

a panel having a plurality of fiber optic connectors mounted thereto, the panel having two ends with a securing hole, the panel has a front side and a back side, the fiber optic connectors extending through the panels from the front to the back side;

an adapter having two adapter members, each of the adapter members having a body with an inner side, an outer side, and two ends, two mounting members extend from the two ends along the outer side of the adapter member, a panel mounting portion is disposed along the inner side of the adapter member, the panel mounting portion includes an angled slot with opposing walls, the slot being dimensioned to receive the ends of the panel, two recesses extend along each of the opposing walls, the recesses being aligned with each other and with the securing hole;

whereby the adapter members are received along both of the ends of the panel, the mounting members being received within adjacent parallel latching arms of a telecommunications box, such that the fiber optic connectors are angled within the box.

12. A fiber optic connector assembly, comprising:

a panel having a plurality of fiber optic connectors mounted thereto, the panel having two ends with a securing hole;

an adapter having two adapter members, each of the adapter members having a body with an inner side, an outer side, and two ends, two mounting members extend from the two ends along the outer side of the adapter member, a panel mounting portion is disposed along the inner side of the adapter member, the panel mounting portion includes an angled slot with opposing walls, the slot being dimensioned to receive the ends of the panel, the angled slot being approximately 60 degrees from the mounting members, two recesses extend along each of the opposing walls, the recesses being aligned with each other and with the securing hole;

whereby the adapter members are received along both of the ends of the panel, the mounting members being received within adjacent parallel latching arms of a telecommunications box, such that the fiber optic connectors are angled within the box.

13. A fiber optic connector assembly, comprising:

a panel having a plurality of fiber optic connectors mounted thereto, the panel having two ends with a securing hole;

an adapter having two adapter members, each of the adapter members having a body with an inner side, an outer side, and two ends, two mounting members extend from the two ends along the outer side of the adapter member, the mounting members extend parallel to each other on either end of the adapter member, a panel mounting portion is disposed along the inner side of the adapter member, the panel mounting portion includes an angled slot with opposing walls, the slot being dimensioned to receive the ends of the panel, two recesses extend along each of the opposing walls, the recesses being aligned with each other and with the securing hole;

whereby the adapter members are received along both of the ends of the panel, the mounting members being received within adjacent parallel latching arms of a telecommunications box, such that the fiber optic connectors are angled within the box.

14. A fiber optic connector assembly, comprising:

a panel having a plurality of fiber optic connectors mounted thereto, the panel having two ends with a securing hole;

an adapter having two adapter members, each of the adapter members having a body with an inner side, an outer side, and two ends, two mounting members extend from the two ends along the outer side of the adapter member, a panel mounting portion is disposed along the inner side of the adapter member, the panel mounting portion includes an angled slot with opposing walls, the slot being dimensioned to receive the ends of the panel, two recesses extend along each of the opposing walls, the recesses being aligned with each other and with the securing hole, when the panel is received into the angled slot, the securing hole is in alignment with the two recesses along the opposing walls, to receive a securing member therein to secure the panel to the adapter member;

whereby the adapter members are received along both of the ends of the panel, the mounting members being received within adjacent parallel latching arms of a telecommunications box, such that the fiber optic connectors are angled within the box.

* * * * *

UNITED STATES PATENT AND TRADEMARK OFFICE
CERTIFICATE OF CORRECTION

PATENT NO. : 5,724,467
DATED : March 3, 1998
INVENTOR(S) : John P. vandenEnden, Gregory H. Porter It is certified that error appears in the above-identified patent and that said Letters Patent is hereby corrected as shown below:

On the title page, item [54] and Col. 1, line 3
In the Title:

Correct spelling of Telecommuniations to read Telecommunications

Signed and Sealed this

Twenty-second Day of September, 1998

Attest:

BRUCE LEHMAN

*Attesting Officer*  *Commissioner of Patents and Trademarks*